US007027995B2

(12) United States Patent
Kaufman et al.

(10) Patent No.: US 7,027,995 B2
(45) Date of Patent: Apr. 11, 2006

(54) DYNAMIC RESOURCE SCHEDULING TO OPTIMIZE LOCATION OF MEETING PARTICIPANTS

(75) Inventors: James H. Kaufman, San Jose, CA (US); Joann Ruvolo, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 930 days.

(21) Appl. No.: 09/870,656

(22) Filed: Jun. 1, 2001

(65) Prior Publication Data

US 2002/0184063 A1 Dec. 5, 2002

(51) Int. Cl.
*G06Q 90/00* (2006.01)
(52) U.S. Cl. ......................................................... 705/8
(58) Field of Classification Search ...................... 705/8
See application file for complete search history.

(56) References Cited

U.S. PATENT DOCUMENTS

| 4,626,836 | A |   | 12/1986 | Curtis et al. ................. 340/706 |
|---|---|---|---|---|
| 4,744,028 | A | * | 5/1988 | Karmarkar ....................... 705/8 |
| 5,050,077 | A |   | 9/1991 | Vincent ......................... 364/401 |
| 5,124,912 | A |   | 6/1992 | Hotaling et al. ............. 364/401 |
| 5,303,145 | A |   | 4/1994 | Griffen et al. ............... 364/401 |
| 5,317,683 | A |   | 5/1994 | Hager et al. ................. 395/145 |
| 5,323,314 | A |   | 6/1994 | Baber et al. ................. 364/401 |
| 5,387,011 | A |   | 2/1995 | Freund ......................... 283/61 |
| 5,790,974 | A |   | 8/1998 | Tognazzini ................... 701/204 |
| 5,842,009 | A |   | 11/1998 | Borovoy et al. ............. 395/601 |
| 6,035,278 | A |   | 3/2000 | Mansour ......................... 705/9 |
| 6,324,517 | B1 | * | 11/2001 | Bingham et al. ............... 705/8 |
| 6,865,538 | B1 | * | 3/2005 | Chithambaram et al. ...... 705/1 |
| 6,873,851 | B1 | * | 3/2005 | Brown et al. ............. 455/456.3 |

FOREIGN PATENT DOCUMENTS

EP 0717544 A2 * 6/1996

OTHER PUBLICATIONS

Backhaus, An Engineer's View of Economics: Wilhelm Launhardt's Contributions, Journal of Economic Studies, vol. 72, No. 4/5, 2000, starting p. 424 [DIALOG: file 15].*
Kolbus, Building a Collaborative Advantage, Work Study, vol. 41, No. 1, Jan./Feb. 1992, start p. 10 [PROQUEST].*

* cited by examiner

*Primary Examiner*—Tariq R. Hafiz
*Assistant Examiner*—Michael C. Heck
(74) *Attorney, Agent, or Firm*—Lacasse & Associates, LLC; Randy W. Lacasse; Ramraj Soundararajan (57) ABSTRACT

A global positioning system (GPS) is used to detect locations (dynamic locations) associated with meeting participants and the proximity between participants is used to create one or more location clusters. Next, the availability of suitable meeting locations (static locations) are identified and an optimum meeting location, given the participant clusters and their proximity to the available meeting locations, is determined. Additionally, the center of mass associated with each of the clusters is also used to determine optimal meeting locations. Lastly, participants are notified regarding the optimized location for the meeting.

22 Claims, 8 Drawing Sheets

$$\vec{V}_{cm} = \left( \frac{\sum_{i=1}^{N} w_i x_i}{N \sum_{i=1}^{N} w_i}, \frac{\sum_{i=1}^{N} w_i y_i}{N \sum_{i=1}^{N} w_i}, \frac{\sum_{i=1}^{N} w_i z_i}{N \sum_{i=1}^{N} w_i} \right)$$

DYNAMIC RESOURCE SCHEDULING TO OPTIMIZE LOCATION OF MEETING PARTICIPANTS

BACKGROUND OF THE INVENTION

1. Field of Invention

The present invention relates generally to the field of scheduling systems. More specifically, the present invention is related to optimizing resources and dynamically scheduling such optimized resources.

2. Discussion of Prior Art

Meetings occupy a large part of the day for many people. Meetings are typically scheduled in advance. One of the many attributes of a meeting that is set when a meeting is scheduled (between one or more participants) is the meeting location. The selection of a meeting location usually only takes into account the availability of the location and the anticipated proximity of one or more participants to the location. However, there is no mechanism to optimize the meeting location based on real-time locations of its participants.

The following references describe scheduling systems in general. The prior art systems described below require manual user interaction to identify appropriate meeting locations for one or more participants.

U.S. Pat. No. 5,124,912 provides for a meeting management device, wherein the device determines the optimal meeting date and time, for a specified group of invitees, based on a set of specified time parameters. Furthermore, the device compares available dates and times of each critical invitee with each other, and compares available dates and times with that of any critical pieces of equipment and meeting sites. The comparison determines common available dates and times for scheduling meetings. However, it should be noted that the device does not optimize for best location of meetings. Furthermore, the device does not handle impromptu meetings and does not adjust meeting locations as a function of time and participants. Additionally, the patent fails to mention the use of the device in conjunction with a personal information management (PIM) system.

U.S. Pat. No. 5,790,974 describes a personal calendaring system that includes a portable calendaring system and a complementary office calendar system, each synchronizing calendar entries by two-way wireless transmission. It should be noted that although this patent mentions managing locations, it is strictly in the context of one or more participants adjusting schedules or being late. Furthermore, there is no mention of identifying locations based on group-optimization.

U.S. Pat. No. 5,842,009 discloses a system for automatically retrieving information relevant to a user's scheduled event. The patent fails to mention optimization based on location.

U.S. Pat. No. 5,323,314 relates to a system for graphical representation of the availability of meeting sites, attendees, equipment, etc., for use in a data processing system that lists scheduled calendar events. Additionally, U.S. Pat. Nos. 6,035,278, 5,387,011, 5,317,683, 5,303,145, 5,050,077, and 4,626,836 provide for a general description of prior art scheduling systems.

Whatever the precise merits, features and advantages of the above cited references, none of them achieve or fulfills the purposes of the present invention.

SUMMARY OF THE INVENTION

In the preferred embodiment, the present invention provides for a system and method for dynamic resource scheduling to optimize the location of meeting participants. The present invention is used in conjunction with a positioning system, such as a global positioning system (GPS), that is able to identify one or more participants and is able to detect the locations associated with these participants. Furthermore, static locations (e.g., conference rooms) are available as inputs to the system and method of the present invention. Given these dynamic positioning inputs associated with one or more participants, the invention detects the location of the meeting participants and clusters them based on their proximity. Next, the invention determines the availability of suitable meeting locations (static locations). Lastly, the invention determines the optimum meeting location, given the participant clusters and their proximity to the available meeting locations.

In one embodiment, one or more filters are applied serially to the resources in question. For instance, an importance rating can be applied to meeting participants, indicating that it is more important to optimize for participant x over participants y and z. Some examples of variables to optimize for, other than location, include airfare, flight availability, airline, etc. This is quite useful, for example, for participants traveling long distances.

In a further embodiment, the time zones of the participants are taken into account to optimize the meeting time. This can be useful, for example, when scheduling a conference call that spans multiple locations, across many time zones.

In yet another embodiment, when scheduling meeting locations, the location coordinates of the adjacent meetings are used in place of the live coordinates of the client. Additionally, meetings scheduled in advance are accommodated by using the location coordinates of adjacent meetings for the scheduled participants. Furthermore, the meeting location is updated as the meeting time approaches, taking into account schedule changes, as well as real-time location data, if appropriate.

DESCRIPTION OF THE PREFERRED EMBODIMENTS

While this invention is illustrated and described in a preferred embodiment, the invention may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

The present invention provides for a system and method for dynamic resource scheduling to optimize the location of one or more participants. Although, in the preferred embodiment, the invention is described in terms of optimizing locations at a given point in time, this should not be used to limit the scope of the present invention. Thus, one skilled in the art can implement the present invention for the purposes of optimizing resources at any point in time. Furthermore, although the variable to be optimized in the preferred embodiment is the location of meetings, this should not be used to restrict the scope of the invention. Thus, the system of the present invention can be extended by one skilled in the art, without departing from the scope of the present invention, to encompass optimizing other variables such as airfare, flight availability, airline, etc.

Figure 1:
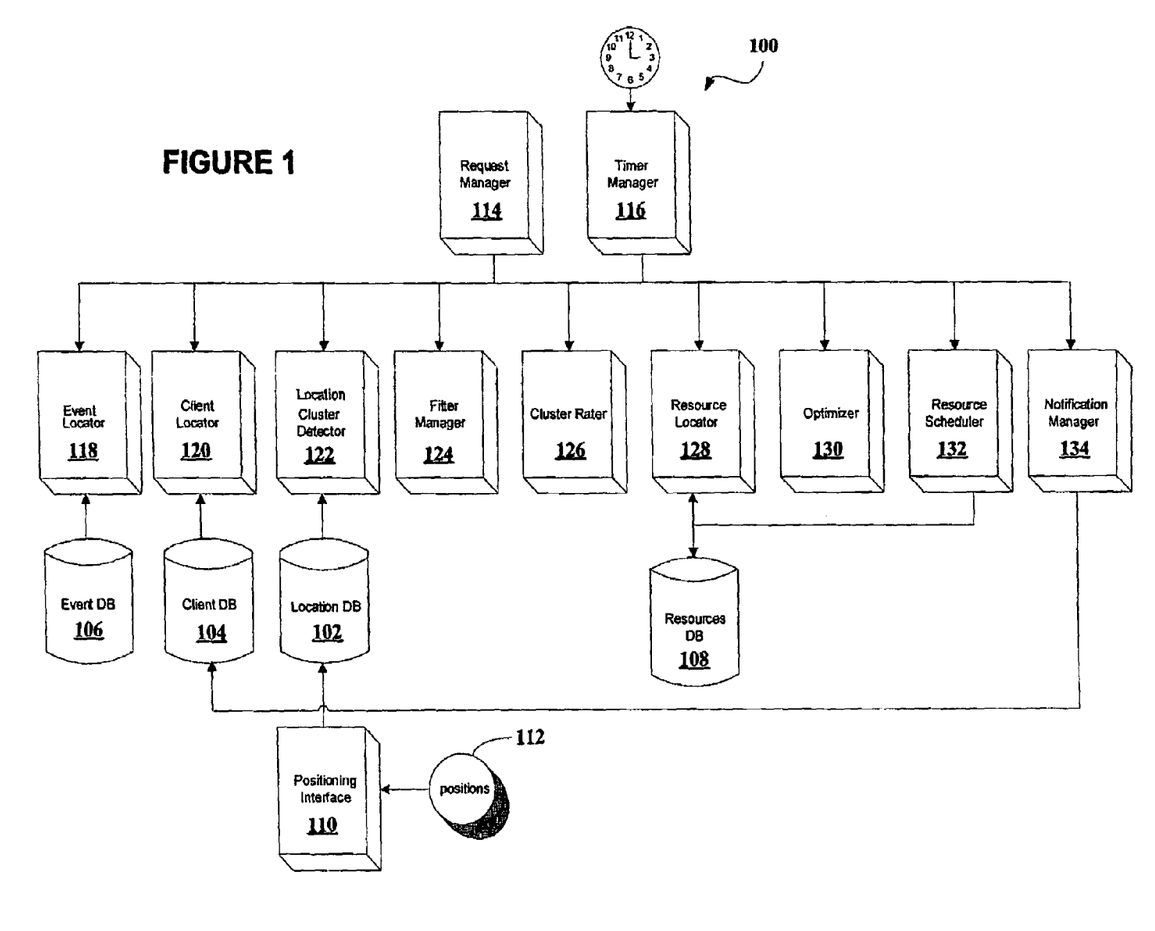
FIG. 1 illustrates an overview of the preferred embodiment of the system of the present invention.

FIG. 1 illustrates an overview of the preferred embodiment of the system of the present invention. System 100 contains the following data sources:

Data Sources

1. Location DB

Location database 102 contains records pertaining to dynamic as well as static locations. Dynamic locations are represented by positioning information received by GPS (global positioning system) devices. In one embodiment, this positioning information contains the longitude, latitude and altitude coordinates, and the identifier of the associated GPS device. This identifier is used to map the client with the GPS device. Additionally, the timestamp identifying when the coordinates were received is stored in the location record. Static locations, on the other hand, are also represented by coordinates and are constant in value. Some examples of static locations include houses, shopping centers, office building, and rooms.

2. Client DB

Client database 104 contains records, one for each client of the system. In the preferred embodiment, the client record contains any of the following information: names of one or more clients, their email address, and the identifier(s) for any GPS devices they may possess.

3. Event DB

Event database 106 contains records representing the events (past, present, or scheduled) of the system. In the preferred embodiment, an event contains attributes, such as start time, end time, description, location, participants.

4. Resources DB

Resources database 108 contains records, one for each resource of the system. The resources are 'typed', wherein an example of type is location. Other examples of resources of type location include, but are not limited to, conference rooms and hotel rooms. Resources are context-sensitive, and contain information relevant to their management. In the preferred embodiment, for the purposes of efficient management of meeting locations, the following information (regarding each resource) is stored: its location, the minimum and maximum number of participants, its availability, and any special audio/visual equipment associated with the location. Storage of a specific set of information related to one or more resources is described in the preferred embodiment of the present invention. However, one skilled in the art can envision storing other related resource information without departing from the scope of the present invention.

System Components

System 100 contains the following components:

1. Positioning Interface

Positioning interface 110 receives positioning information 112 via one or more electronic devices associated with its clients. It creates a location record from the input positioning information and adds the record to the location database.

2. Request Manager

Request manager 114 gets control from a user request for resource scheduling. It calls the appropriate system components to satisfy the request.

3. Timer Manager

Timer manager 116 gets control either from a system timer pop at regular intervals or at a predetermined interval prior to scheduled events. The intervals can be defined as system properties of the dynamic resource scheduler system.

4. Event Locator

Event locator 118 accesses event database 106 to obtain information about particular events (e.g., date/time, location).

5. Client Locator

Client locator 120 accesses client database 104 to obtain information about a particular client (e.g., the client's e-mail address, the GPS devices associated with the client).

6. Location Cluster Detector

Figure 2:
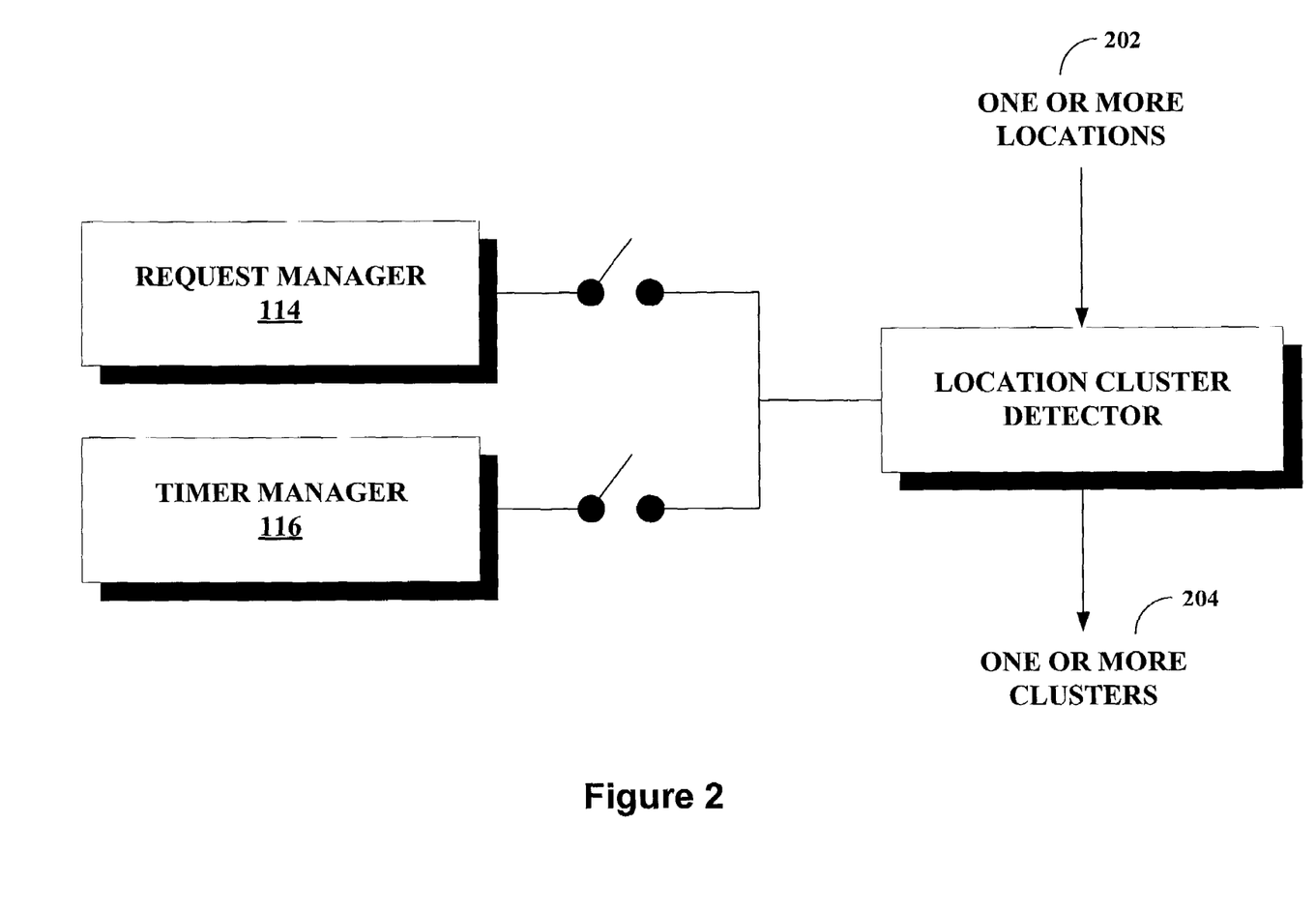
FIG. 2 illustrates the inputs and outputs associated with location cluster detector of FIG. 1.

Location cluster detector 122 is called from either request manager 114 or timer manager 116. FIG. 2 illustrates the inputs and outputs associated with location cluster detector 122 of FIG. 1. One or more locations 202 are input to location cluster detector 122. In the preferred embodiment, these locations are represented as coordinates (e.g., longitude, latitude, and altitude). Location cluster manager 122 outputs one or more clusters 204, each containing the input locations within that cluster and their default rating.

Figure 3:
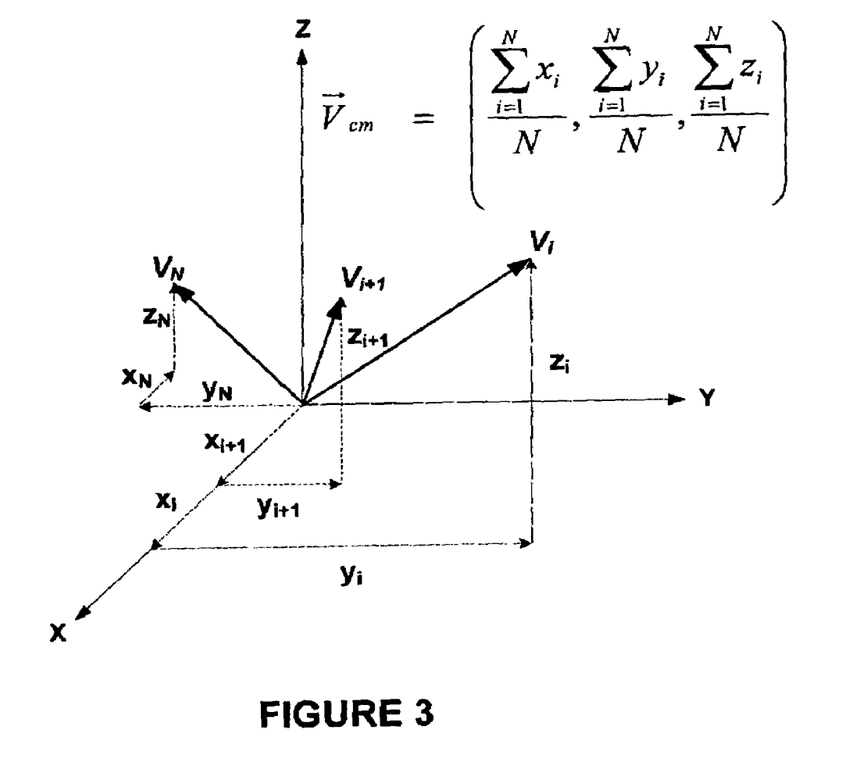
FIG. 3 illustrates a center of mass calculation scenario wherein all participants have equal weights.

Clusters are created based on the proximity of the input locations. An algorithm for location clustering wherein all parties to an event are equally important is simply obtained by averaging the individual normal position coordinates. FIG. 3 illustrates an embodiment wherein locations associated with participants i through N (i, i+1, . . . , N) are represented by vectors $V_i$ through $V_N$ ($V_i$, $V_{i+1}$, . . . , $V_N$), which are further decomposed into their x, y and z components. For example, vector $V_i$ corresponding to the location of $i^{th}$ participant is decomposed into $x_i$, $y_i$, and $z_i$. Furthermore, the center of mass of this cluster of participants is given by the vector:

$$\vec{V}_{cm} = \left( \frac{\sum_{i=1}^{N} x_i}{N}, \frac{\sum_{i=1}^{N} y_i}{N}, \frac{\sum_{i=1}^{N} z_i}{N} \right)$$

Figure 4:
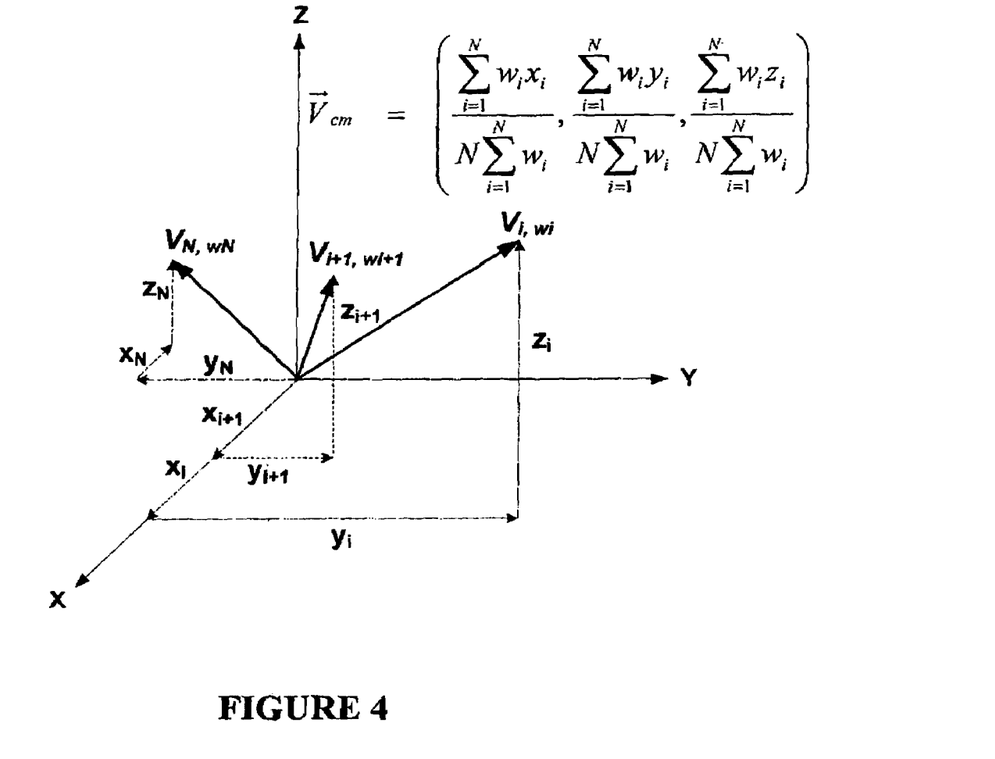
FIG. 4 illustrates a center of mass calculation scenario wherein participants have different weights.

FIG. 4 illustrates another embodiment wherein locations associated with participants i through N (i, i+1, . . . , N) are represented by vectors $V_i$ through $V_N$ ($V_i$, $V_{i+1}$, . . . , $V_N$), which are further decomposed into their x, y and z components, but unlike the scenario illustrated in FIG. 3, there is a different weighting factor $w_i$ associated with each participant. In this case, the center of mass of this cluster of participants with different weights is given by:

$$\vec{V}_{cm} = \left( \frac{\sum_{i=1}^{N} w_i x_i}{N \sum_{i=1}^{N} w_i}, \frac{\sum_{i=1}^{N} w_i y_i}{N \sum_{i=1}^{N} w_i}, \frac{\sum_{i=1}^{N} w_i z_i}{N \sum_{i=1}^{N} w_i} \right)$$

Given the vector $V_{cm}$, the system of the present invention performs a search for identifying locations in the vicinity (as close as possible) of $V_{cm}$. In an extended embodiment, the system performs a search to identify a location that is both close and also satisfies other restrictions and filters criterions. For example, a search is performed to find the nearest airport to $V_{cm}$, and then find a meeting location as close as possible to the airport's coordinates.

7. Filter Manager

Filter manager 124 is called from either request manager 114 or timer manager 116. Possible filters include importance rating of participants and considerations associated with travel to a particular location (e.g., airfare, flight availability, central hubs). The preferred embodiment described filters in terms of assigning/changing importance ratings associated with one or more participants, however, one skilled in the art can envision the system of the present invention to encompass other filters and other filter related criteria.

In an extended embodiment, more than one filter is applied to the clusters, and the filters are applied serially. When the last filter has been applied, the clusters are rated via the cluster rater 126.

8. Cluster Rater

Figure 5:
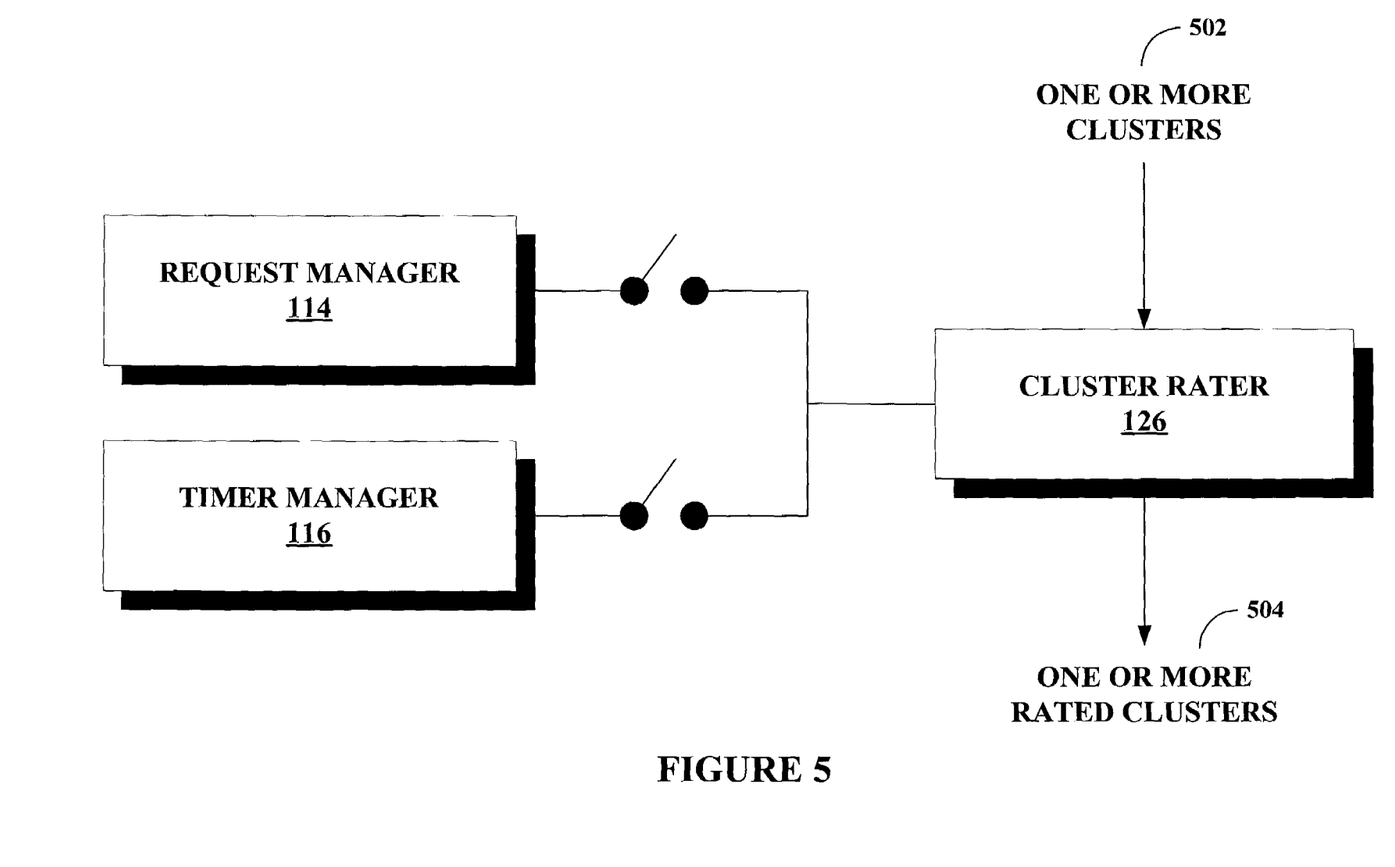
FIG. 5 illustrates the inputs and outputs associated with the cluster rater of FIG. 1.

Cluster rater 126 is called from either request manager 114 or timer manager 116. FIG. 5 illustrates the inputs and outputs associated with the cluster rater 126 of FIG. 1. In the preferred embodiment, input to cluster rater 126 is one or more clusters 502. It rates the input clusters, to output one or more rated clusters 504, given the ratings within the elements of each cluster. These ratings are either the default ratings or have been modified by filter manager 124.

9. Resource Locator

Resource locator 128 accesses the resource database to obtain information about particular resources and to update particular resources. The resource locator is called from either request manager 114 or timer manager 116 for information about the availability of suitable meeting locations. Furthermore, resource locator 128 is accessible by resource scheduler 132 to reserve a meeting location (or cancel a reservation).

For example, the resource scheduler is able to access the resource locator and reserve a meeting location, or on the other hand, the resource scheduler is able to access the resource locator and cancel a previously scheduled meeting.

10. Optimizer

Figure 6:
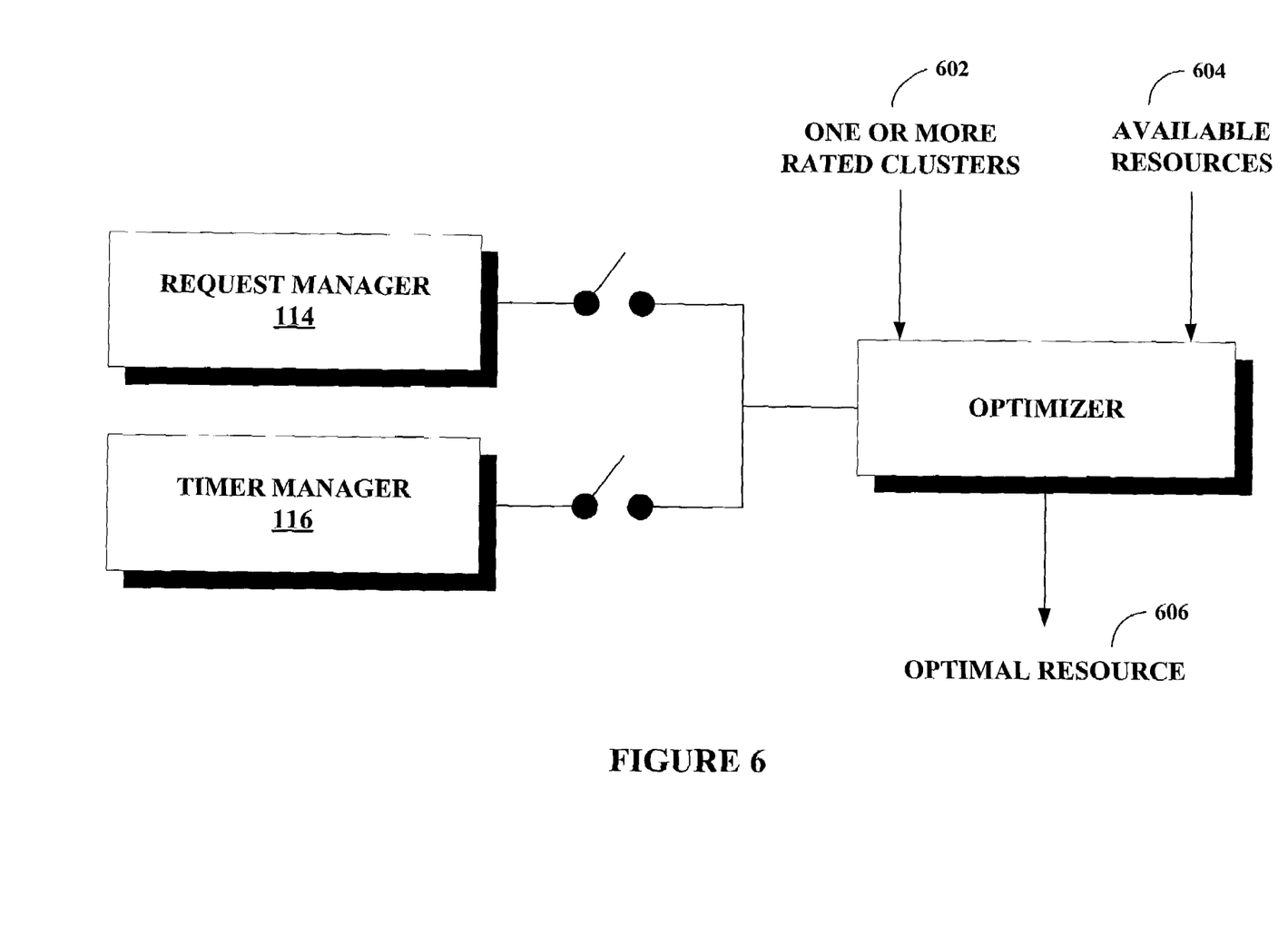
FIG. 6 illustrates the inputs and outputs associated with the optimizer of FIG. 1.

FIG. 6 illustrates the inputs and outputs associated with optimizer 130 of FIG. 1. Optimizer 130 is called from either request manager 114 or timer manager 116. Optimizer 130 is called with two inputs: the clusters of participant locations 602 and the available resources 604. Output from optimizer 130 is the resource determined to be the optimum meeting location 606 for the given participants, taking into account their ratings (affected by the application of filters).

11. Resource Scheduler

Resource scheduler 132 is responsible for reserving and canceling meeting locations.

12. Notification Manager

Notification manager 134 is called to inform clients of resources that have been scheduled. Notification manager 134 then contacts the client by various means, such as email.

Although in the specification the center of mass calculation is done in location cluster detector 122, it should be noted that this calculation is not restricted to this component, and hence should not be used to limit the scope of the present invention. In the preferred embodiment, the center of mass calculation is performed in optimizer 130. But, others skilled in the art can envision other embodiments wherein the center of mass calculation is performed in other system components including an independent center of mass calculation engine that calculates the center of mass and passes the results to optimizer 130.

Figure 7:
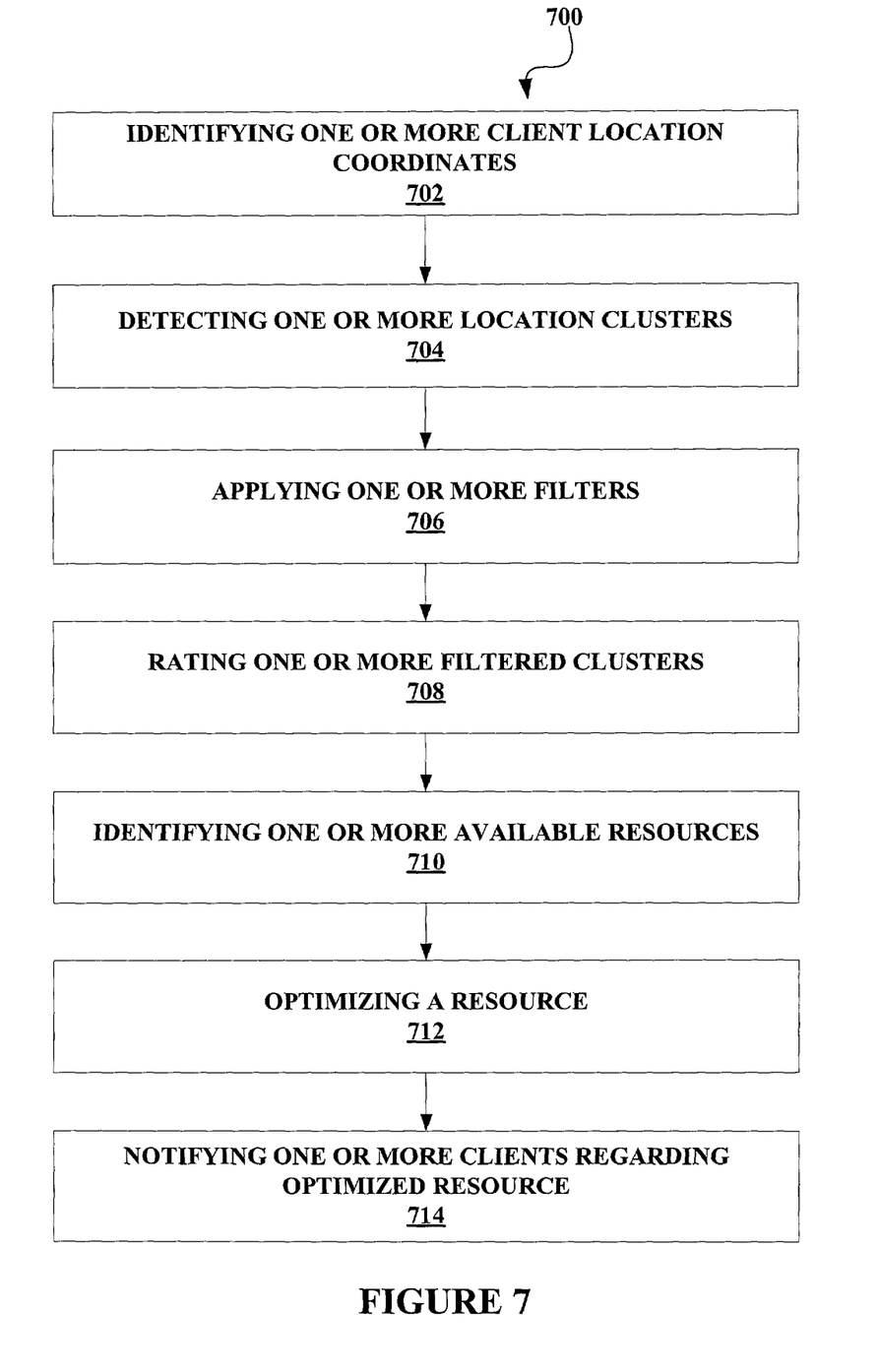
FIG. 7 illustrates the general method of the present invention.

FIG. 7 illustrates general method 700 associated with the preferred embodiment of the present invention. In step 702, one or more client location coordinates are identified and, in step 704, one or more clusters are detected from the identified client location coordinates. Next, in step 706, one or more filters are applied to the detected one or more location clusters. Then, the filtered clusters are rated in step 708. As a next step (step 710), one or more available resources are identified. In step 712, at least one resource is optimized, based on the location and filter information available, as the best location for one or more participants to meet. Lastly, in step 714, one or more participants involved in the meeting are notified regarding the identified at least one optimal resource.

Figure 8:
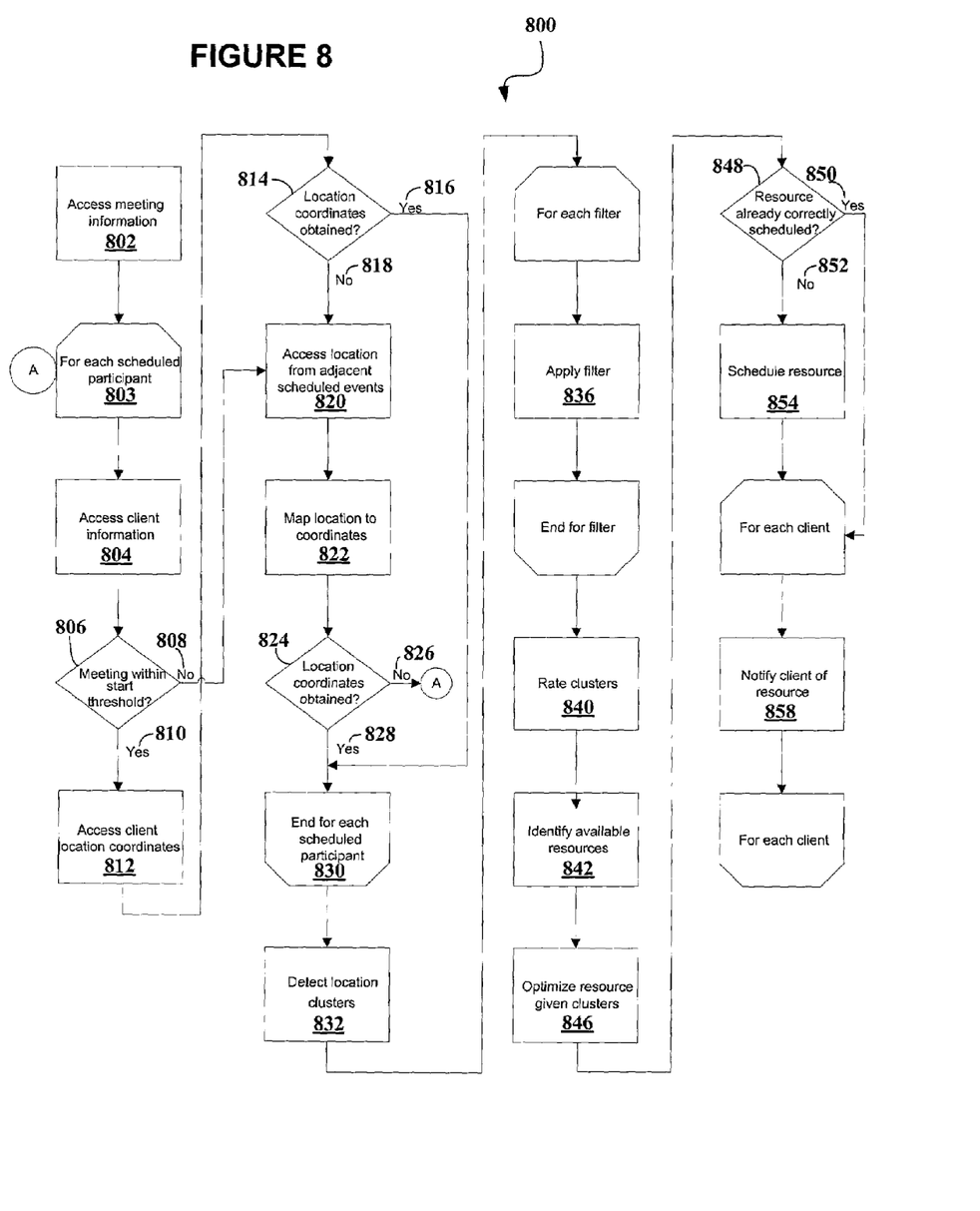
FIG. 8 illustrates the preferred embodiment of the method of the present inventions

FIG. 8 depicts in greater detail the present invention's method 800 for dynamically scheduling optimized resources. First, information regarding one or more meetings is accessed 802. Next, for each scheduled participant (803) in the meetings, client information is accessed (804). As a next step, a decision is made with regard to whether meeting is within start threshold (806), and if so (810), the client location coordinates are identified (812) and a check 814 is performed to see if location coordinates are obtained (Yes-816). On the other hand, if the meeting is not within start threshold (808), or if the location coordinates, in step 814, are not obtained (No-818), then the locations from adjacent scheduled events are accessed (820). Next, the locations are mapped to coordinates (822). Once again, in step 824, a check is performed to see if location coordinates are obtained, and, if so (828), the loop for accessing information regarding each participant is terminated (830). Similarly, in the instance the locations coordinates are obtained (816) in step 814, the loop for accessing information regarding each participant is terminated. Furthermore if, in step 824, location coordinates are not obtained (826), then steps starting from step 803 are repeated.

Next, location clusters are detected (832) and one or more filters are applied to the detected locations clusters (836). As a next step, the filtered clusters are rated (840) and all available resources are identified (842). After that, at least one resource is optimized (846) given the rated and filtered clusters. A check (848) is then performed to see if the resource identified in step 846 was already scheduled for the meeting, and if so (850), each participant of the meeting is notified of this (858). In the instance the resource is not scheduled (852), the resource is scheduled (854) and each of the participants associated with the meeting are notified regarding this scheduled resource (858).

Thus, the present invention provides for a system and method for optimizing resources and scheduling such optimized resources. Furthermore, the system and method provide for the ability to adjust meeting locations as a function of time and participants. Moreover, the present invention is envisioned to be implemented in PIM systems such as personal digital assistants (PDAs), Palm® Pilots, pagers, mobile phones, mobile computers, cellular phones and other equivalent systems.

Furthermore, the present invention includes a computer program code based product, which is a storage medium having program code stored therein, which can be used to instruct a computer to perform any of the methods associated with the present invention. The computer storage medium includes any of, but not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM or any other appropriate static or dynamic memory, or data storage devices.

Implemented in a computer usable medium are software modules for receiving one or more locations, outputting one or more clusters based on proximity of said received locations, rating one or more clusters, accessing said one or more databases and locating one or more resources, identifying at least one optimized resource, and dynamically scheduling said optimized resource.

CONCLUSION

A system and method has been shown in the above embodiments for the effective implementation of a dynamic resource scheduling system to optimize location of meeting participants. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by type of variable being optimized, specific set of stored information regarding resources, filter types, filter parameters, software/program, or computing environment.

The above enhancements and their described functional elements are implemented in various computing environments. For example, the present invention may be implemented on a conventional IBM PC or equivalent, multi-nodal system (e.g. LAN) or networking system (e.g. Internet, WWW, wireless web). All programming and data related thereto are stored in computer memory, static or dynamic, and may be retrieved by the user in any of: conventional computer storage, display (i.e. CRT) and/or hardcopy (i.e. printed) formats. The programming of the present invention may be implemented by one of skill in the art of clustering algorithms.

The invention claimed is:

1. A system for determining optimal resources based upon client location and resource locations, said system comprising:
    a. one or more databases containing dynamic client location data and static resource location data;
    b. a cluster detector retrieving dynamic client location data from one or more databases to determine one or more client locations and creating one or more client clusters, each of said client clusters having one or more weights associated with them;
    c. a cluster rater receiving said one or more client clusters and outputting one or more weighted clusters;
    d. a locator determining one or more resources and retrieving static resource location data from said one or more databases;
    e. an optimizer computing at least one optimized resource based upon said weighted clusters and said static resource location data, and
    f. a scheduler dynamically scheduling said at least one optimized resource, wherein said system further includes a positioning interface receiving, from one or more remote electronic devices associated with one or more clients, dynamic client location information and saving said dynamic client location information onto said location database.

2. A system for determining optimal resources based upon client location and resource locations, as per claim 1, wherein said optimizer further calculates a center of mass associated with each of said weighted clusters and utilizes said calculated center of mass in said computation of at least one optimized resource.

3. A system for determining optimal resources based upon client location and resource locations, as per claim 2, wherein said center of mass calculation is done using:

$$\vec{V}_{cm} = \left( \frac{\sum_{i=1}^{N} w_i x_i}{N \sum_{i=1}^{N} w_i}, \frac{\sum_{i=1}^{N} w_i y_i}{N \sum_{i=1}^{N} w_i}, \frac{\sum_{i=1}^{N} w_i z_i}{N \sum_{i=1}^{N} w_i} \right),$$

where w is the weight associated with each client in a client cluster, N is the total number of clients in said client cluster, and x, y, and z are coordinate locations associated with each client in said client cluster.

4. A system for determining optimal resources based upon client location and resource locations, as per claim 1, wherein said system further comprises a center of mass calculation engine, said engine calculating a center of mass associated with each of said weighted clusters and passing said calculated center of mass to said optimizer for computing said at least one optimized resource.

5. A system for determining optimal resources based upon client location and resource locations, as per claim 4, wherein said center of mass calculation is done using:

$$\vec{V}_{cm} = \left( \frac{\sum_{i=1}^{N} w_i x_i}{N \sum_{i=1}^{N} w_i}, \frac{\sum_{i=1}^{N} w_i y_i}{N \sum_{i=1}^{N} w_i}, \frac{\sum_{i=1}^{N} w_i z_i}{N \sum_{i=1}^{N} w_i} \right),$$

where w is the weight associated with each client in a client cluster, N is the total number of clients in said client cluster, and x, y, and z are coordinate locations associated with each client in said client cluster.

6. A system for determining optimal resources based upon client location and resource locations, as per claim 1, wherein said weights associated with said clients are equal in value.

7. A system for determining optimal resources based upon client location and resource locations, as per claim 1, wherein said resources are any of the following: meeting location, airfare, flight availability, or airline.

8. A system for determining optimal resources based upon client location and resource locations, as per claim 1, wherein said system further comprises a filter manager passing said one or more clusters through one or more filters, said filters modifying at least one weight associated with each of said client clusters.

9. A system for determining optimal resources based upon client location and resource locations, as per claim 1, wherein said retrieved dynamic client location data is a set of coordinate data, said coordinate data comprising longitude, latitude, and altitude information.

10. A system for determining optimal resources based upon client location and resource locations, as per claim 1, wherein said one or more databases comprises a plurality of the following databases: a location database containing records of locations, a client database containing records regarding said one or more clients, an event database containing information regarding events associated with one or more clients, or a resource database containing records of said one or more resources.

11. A system for determining optimal resources based upon client location and resource locations, as per claim 1, wherein said system further comprises a notification manager updating said one or more databases and notifying one or more clients regarding said scheduled at least one resource.

12. A system for determining optimal resources based upon client location and resource locations, as per claim 11, wherein said notification is done via an electronic mail message.

13. A computer-based method for optimizing resources and dynamically scheduling said resources, said method comprising the steps of:
  a. identifying dynamic location coordinates associated with one or more participants, each of said participants associated with a rating;
  b. detecting one or more location clusters from said identified dynamic location coordinates, based on proximity of said participants;
  c. creating a rated cluster from each of said location clusters, based on said ratings associated with participants within each of said location clusters;
  d. calculating a center of mass associated with each of said rated clusters;
  e. identifying available resources and retrieving static resource location data from one or more databases;
  f. optimizing at least one resource based on said identified resource and said calculated center of mass, and
  g. dynamically scheduling said optimized at least one resource.

14. A computer-based method for optimizing resources and dynamically scheduling said resources, as per claim 13, wherein said method further comprises the step of filtering said location clusters to modify said ratings.

15. A computer-based method for optimizing resources and dynamically scheduling said resources, as per claim 13, wherein said center of mass calculation is done using:

$$\vec{V}_{cm} = \left( \frac{\sum_{i=1}^{N} w_i x_i}{N \sum_{i=1}^{N} w_i}, \frac{\sum_{i=1}^{N} w_i y_i}{N \sum_{i=1}^{N} w_i}, \frac{\sum_{i=1}^{N} w_i z_i}{N \sum_{i=1}^{N} w_i} \right),$$

where w is the weight associated with each client in a client cluster, N is the total number of clients in said client cluster, and x, y, and z are coordinate locations associated with each client in said client cluster.

16. A computer-based method for optimizing resources and dynamically scheduling said resources, as per claim 15, wherein said weights associated with said clients are equal in value.

17. A computer-based method for optimizing resources and dynamically scheduling said resources, as per claim 13, wherein said method further comprises notifying said one or more participants regarding said optimized at least one resource.

18. A computer-based method for optimizing resources and dynamically scheduling said resources, as per claim 13, wherein said resources are any of the following: meeting location, airfare, flight availability, or airline.

19. A computer-based method for optimizing resources and dynamically scheduling said resources, as per claim 13, wherein said notification is done via an email message.

20. An article of manufacture comprising a computer usable medium having computer readable program code embodied therein which optimizes resources and dynamically scheduling said optimized resources, said medium further comprising:
  a. computer readable program code identifying dynamic location coordinates associated with one or more participants, each of said participants associated with a rating;
  b. computer readable program code detecting one or more location clusters from said identified dynamic location coordinates, based on proximity of said participants;
  c. computer readable program code creating a rated cluster from each of said location clusters, based on said ratings associated with participants within each of said location clusters;
  d. computer readable program code identifying available resources and retrieving static resource location data from one or more databases;
  e. computer readable program code optimizing at least one resource based on said identified resource and said rated clusters, and
  f. computer readable program code dynamically scheduling said optimized at least one resource.

21. An article of manufacture comprising a computer usable medium having computer readable program code embodied therein which optimizes resources and dynamically scheduling said optimized resources, as per claim 20, said medium further comprising computer readable program code filtering said location clusters to modify said ratings.

22. An article of manufacture comprising a computer usable medium having computer readable program code embodied therein which optimizes resources and dynamically scheduling said optimized resources, as per claim 20, wherein said resources are any of the following: meeting location, airfare, flight availability, or airline.

* * * * *

Disclaimer

Patent No. 7,027,995 - James H. Kaufman, San Jose, CA; Joann Ruvolo, San Jose, CA. DYNAMIC RESOURCE SCHEDULING TO OPTIMIZE LOCATION OF MEETING PARTICIPANTS. Patent dated Apr. 11, 2006. Disclaimer filed Oct. 06, 2006, by the assignee, INTERNATIONAL BUSINESS MACHINES CORPORATION.

Hereby enters this disclaimer to all claims and the entire term of said patent.

*(Official Gazette September 23, 2008)*